Patented Oct. 16, 1934

1,976,758

UNITED STATES PATENT OFFICE 1,976,758

SAFETY GLASS

George B. Watkins and Joseph D. Ryan, Toledo, Ohio, assignors to Libbey-Owens-Ford Glass Company, Toledo, Ohio, a corporation of Ohio No Drawing. Application April 2, 1932, Serial No. 602,871

4 Claims. (Cl. 49—81)

The present invention relates to the art of safety glass manufacture and more particularly to a bonding material or adhesive for use in the bonding together of glass and cellulose ester plastic.

Broadly stated, the invention resides in the formation and use of oxycellulose acetate in such a bonding material. We have found that the acetate of oxycellulose, when dispersed or dissolved in suitable plasticizers or high boiling point, low vapor pressure solvents, makes an excellent adhesive for bonding cellulose acetate plastic to glass surfaces.

The acetic ester of oxycellulose is characterized by its solubility, being more soluble in water acetone mixtures, for example, than ordinary cellulose acetate, and in contradistinction to cellulose acetate, films produced from oxycellulose acetate possess greater adhesive properties to glass surfaces than films made from cellulose acetate.

The preparation of the acetic ester of oxycellulose differs from the acetic ester of cellulose in that the cellulose, which is the starting point for the preparation of the cellulose acetate, is first subjected to an oxidizing action before it is acetylated to prepare the oxycellulose acetate. Briefly, oxycellulose acetate is prepared by taking ordinary purified cotton, which consists essentially of cellulose, and converting it into oxycellulose by any of the well known methods.

For example, oxycellulose may be prepared from cellulose by subjecting cellulose to any one of a number of oxidizing treatments. Among those widely used are the treatments with potassium permanganate, alkali hypochlorites, chromic acid, chloric acid, nitric acid, and hydrogen peroxide. The method which we have found to give excellent results is the treatment with potassium permanganate in neutral solution at 50° C. The method may be outlined as follows: 50 grams of cellulose were immersed in 3 liters of water in which was dissolved 10 grams of potassium permanganate, and the mixture heated at 50° C. until the permanganate color disappeared. In order to reduce the manganese dioxide formed in the oxidation, sulphur dioxide was passed into the solution until only a colorless suspension of oxycellulose remained. This material was washed thoroughly with water and dried before use.

After the oxycellulose is prepared, it is then acetylated by a mixture of an acetic anhydride and acetic acid in the presence of a catalyzer such as zinc chloride, sulphuric acid, and the like. Very satisfactory results have been obtained in carrying out the acetylation reaction by treating approximately 1 pound of oxycellulose, prepared as above described, with an acetylating mixture prepared by mixing approximately 30 pounds of glacial acetic acid, 9 pounds acetic anhydride, and 1 pound sulphuric acid which serves mainly as a catalyst. The reaction mixture is then allowed to stand at room temperature until substantially all of the oxycellulose has disappeared which means that the oxycellulose has been converted mainly into the triacetate of oxycellulose which is soluble in the acetylating bath.

The acetic ester of the oxycellulose is precipitated from the acetylating bath by pouring the contents of the acetylating bath into a large volume of water. While the triacetate of oxycellulose seems to give fair adhesion when dissolved or dispersed in the proper solvents and used as an adhesive for bonding cellulose acetate plastic to glass surfaces, it is more desirable to partially hydrolyze the resulting triacetate of oxycellulose by boiling it for a short time in dilute solution of hydrochloric acid to get substantially the diacetate of oxycellulose. The reason for the latter step, namely, preparing the diacetate of oxycellulose from the triacetate of oxycellulose is that the diacetate of oxycellulose has a much higher range of solubility in the common cellulose acetate plasticizers and high boiling point, low vapor pressure solvents.

In preparing the bonding agent for the manufacture of safety glass, the acetate derivative of oxycellulose (which consists mainly of the diacetate) is dispersed or dissolved in any of the high boiling point, low vapor pressure solvents or plasticizers for cellulose acetate such as dimethyl phthalate, dibutyl phthalate, triacetin, and the like, in varying proportions.

We have found that the oxycellulose acetate as above prepared can be dissolved or dispersed in most any of the common high boiling point, low vapor pressure solvents, plasticizers, or mixtures thereof, in the concentrations ranging from 5% to 70% of the oxycellulose acetate. It is of course to be understood that in using the higher concentrations of the oxycellulose acetate, it is necessary to decrease the viscosity of the solution or adhesive with one or more of the common volatile solvents such as, for example, acetone, ethyl acetate, methyl cello-solve, and the like, to facilitate the spreading by any known means, such as spraying, rolling, and the like, of the adhesive material in a relatively thin layer on either the glass surfaces or the surfaces of the interposed plastic layer.

The method described above for obtaining the oxycellulose acetate can be modified by starting with ordinary cellulose acetate bought on the open market, which consists mainly of the diacetate of cellulose, and taking the ordinary diacetate and subjecting it to the action of a mild oxidizing treatment similar to that used in producing oxycellulose from cellulose.

While we have found a number of methods which will convert the ordinary cellulose diacetate into the oxycellulose acetate, the one that we have found to give very satisfactory results is as follows: 100 grams of cellulose diacetate bought on the open market is suspended in approximately 3 liters of water in which is dissolved 20 grams of potassium permanganate. The mixture is then heated to 50° C. for sufficient time to permit the decolorization of the potassium permanganate, after which the mixture is filtered and the precipitate, which contains besides oxycellulose acetate considerable magnanese dioxide formed in the oxidation, is washed and dried. The dry product is suspended in acetone which dissolves the oxycellulose acetate and leaves the manganese dioxide suspended. This mixture is centrifuged and the supernatant clear liquid containing the oxycellulose acetate decanted. The oxycellulose acetate is recovered by pouring the acetone solution into a large volume of water which precipitates it. The mixture is then filtered and the oxycellulose acetate washed and dried. The distinction between the reaction product of oxycellulose acetate and the cellulose acetate used as the starting product is readily found by determining the copper number, the solubility in sodium hydroxide, and the adhesive characteristics of films made from the oxycellulose acetate.

Our improved cellulose acetate bonding material is prepared by dissolving or dispersing the oxycellulose acetate, made as above described, in suitable plasticizers or high boiling point, low vapor pressure solvents, or mixtures thereof.

While it may be desirable in some cases to apply our improved bonding material directly upon the surfaces of the glass sheets, nevertheless we have found that equally satisfactory results can be obtained when our bonding material is applied to the cellulose acetate plastic sheet itself and then assembling the said coated plastic layer between properly cleaned glass sheets to form a sandwich which is subsequently subjected to the action of heat and pressure.

We have obtained excellent results in the way of bonding cellulose acetate plastic-glass laminations to form a well bonded unitary structure by subjecting the glass-plastic sandwich to a temperature of approximately 300° F. at a pressure ranging from 40 pounds to 200 pounds per square inch for a period of from six to eight minutes.

We claim:

1. As a new article of manufacture, a sheet of safety glass comprising two sheets of glass and an interposed layer of cellulose ester plastic bonded together with a mixture containing oxycellulose acetate.

2. As a new article of manufacture, a sheet of safety glass comprising two sheets of glass and an interposed layer of cellulose acetate plastic treated with a mixture containing oxycellulose acetate.

3. As a new article of manufacture, a sheet of safety glass comprising two sheets of glass and an interposed layer of cellulose acetate plastic treated with a mixture consisting of oxycellulose acetate dispersed in a plasticizer therefor.

4. An a new article of manufacture, a sheet of safety glass comprising two sheets of glass and an interposed layer of cellulose acetate plastic treated with a mixture consisting of oxycellulose acetate dispersed in dimethyl phthalate.

GEORGE B. WATKINS.
JOSEPH D. RYAN.